C. H. PERKINS.
Horse Shoer's Rasp.
No. 211,864. Patented Feb. 4, 1879.
Fig. 1.
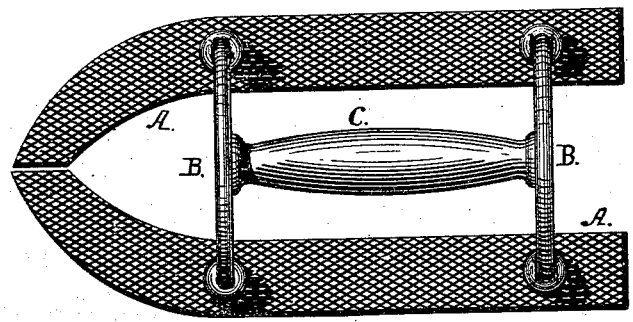
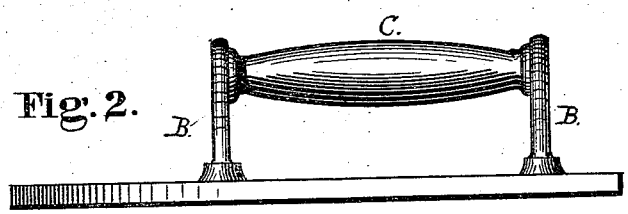
Fig. 2.
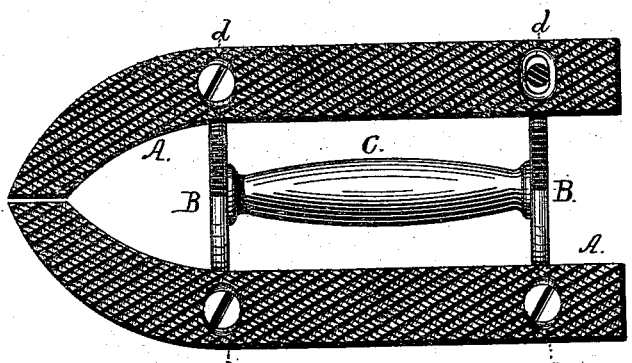
Fig. 3.
WITNESSES.  INVENTOR.

UNITED STATES PATENT OFFICE.

CHARLES H. PERKINS, OF PROVIDENCE, RHODE ISLAND.

IMPROVEMENT IN HORSESHOER'S RASPS.

Specification forming part of Letters Patent No. 211,864, dated February 4, 1879; application filed October 16, 1878.

*To all whom it may concern:*

Be it known that I, CHARLES H. PERKINS, of Providence, in the state of Rhode Island, have made a new and useful Horseshoer's Rasp; and I do hereby declare that the following specification, taken in connection with the drawings making a part of the same, is a full, clear, and exact description thereof.

Figure 1 is a top view of my rasp. Fig. 2 is a side view. Fig. 3 is a bottom view.

My invention is particularly designed to be used in preparing horses' hoofs to receive the shoe; and consists in the device hereinafter described.

In fitting the shoe to the horse's hoof, the latter is first pared down with a butteris, in the well-understood way, after which the under surface of the hoof is smoothed and evened by the well-known blacksmith's rasp.

In order to have the shoe fit properly it is necessary to obtain a perfectly smooth level surface upon both sides. In using the ordinary hand-rasp so much care and skill are required, not only in getting a smooth surface, but in bringing all parts of the hoof to the same level, that a perfect fit is practically seldom secured.

In my invention I make a U-shaped rasp, A A, as shown in Figs. 1 and 2, which is cut in both sides. The two arms of the rasp are connected by curved bars B B, between which and to which the handle C is secured. The arms A A are provided with slots *d*, as shown in Fig. 3, and the curved bars B B, containing the handle, are attached by screws, so that the rasp may be widened or narrowed, as may be desired.

The rasp may be divided at its pointed end, to increase its capability of adjustment to hoofs of different shapes and sizes, and may be disconnected from its handle and reversed when one side has become worn out.

In using my improved rasp the hoof is first pared down with a butteris, in the usual way, after which the rasp is taken in both hands and both sides of the hoof brought to a smooth level surface at the same time, the arms of the rasp passing by the "frog" upon either side as the whole is moved back and forth.

It will now be readily seen that by the use of this tool not only a smooth surface will be easily obtained, but that the entire surface upon which the shoe rests will be brought to the same level.

I do not confine myself entirely to the rasping surface shown, as a series of narrow cutting-edges may be used with good effect.

What I claim as my invention, and desire to secure by Letters Patent, is—

The rasp or cutter herein described, consisting of the laterally-adjustable cutters A A, secured together by braces B, and having a handle, C, for the purposes set forth.

C. H. PERKINS.

Witnesses:
WALTER B. VINCENT,
JOSEPH T. RICH.